United States Patent [19]

Sugimoto

[11] Patent Number: 4,723,471
[45] Date of Patent: Feb. 9, 1988

[54] KEYBOARD DEVICE

[75] Inventor: Keiji Sugimoto, Hamamatsu, Japan

[73] Assignee: Nippon Gakki Seizo Kabushiki Kaisha, Japan

[21] Appl. No.: 868,125

[22] Filed: May 28, 1986

[30] Foreign Application Priority Data

Jun. 18, 1985 [JP] Japan ............................ 60-090921[U]
Dec. 30, 1985 [JP] Japan ............................ 60-204554[U]

[51] Int. Cl.⁴ .............................................. G10C 3/12
[52] U.S. Cl. ....................................... 84/439; 84/433; 84/467
[58] Field of Search ...................... 84/239, 247–249, 84/433, 439–440, 467

[56] References Cited

U.S. PATENT DOCUMENTS

| 506,225 | 10/1893 | Hamilton | 84/249 |
| 2,214,112 | 9/1940 | Schulze | 84/239 |
| 2,280,982 | 4/1942 | Schulze | 84/239 |
| 3,903,780 | 9/1975 | Aliprandi | 84/433 |
| 4,375,179 | 3/1983 | Schwartz | 84/439 |

Primary Examiner—Lawrence R. Franklin
Attorney, Agent, or Firm—Ostrolenk, Faber, Gerb & Soffen

[57] ABSTRACT

In construction of a keyboard device well suited for use on an electronic piano and a piano training device, a combination of a jack element corresponding to a jack on an actual action assembly, an abutment whose force acting on the jack element corresponds to the weight of an actual hammer, and a releaser corresponding to actual regulating button provides key touch very close to that obtained on an actual piano equipped with action assemblies.

8 Claims, 7 Drawing Figures

KEYBOARD DEVICE

BACKGROUND OF THE INVENTION

The present invention relates to a keyboard device, and more particularly relates to a keyboard device well suited for an electronic piano and a piano training device.

Electronic pianos and piano training devices differ from ordinary pianos in that they are not equipped with action assemblies which are indispensable in the construction of ordinary pianos. Due to the absence of such action assemblies, individuals who play an electronic piano or a piano training device cannot enjoy the degree of key touch generally obtained on an ordinary piano with action assemblies.

As a result of the rapid and great growth of sales of electronic pianos, they are used by an increasing number of players who initially mastered the art of piano playing through performance on ordinary pianos. From their experience, these individuals want to control the mode of performance depending on subtle difference in key touch on the fingers. This demand, however, cannot be satisfied due to the fundamental fact that tone generation on electronic pianos is caused by electronic systems rather than hammers and action assemblies.

Piano training devices have also found increasing sales in the market. For professional pianists, it is indispensable to have constant training for improvement and maintenance of their level of skill. However, since pianos generate high and/or voluminous sounds in general, it is very difficult to practice playing at all times and places due to environmental restrictions. Even when a good place to train is found, a great deal of labor and time are needed to transport a massive piano.

As a substitute for an actual piano, use of piano training devices such as disclosed in Japanese Utility Model Openings (JUMO) Nos. Sho. 58-44482 and 51-94367 has been proposed.

In the case of JUMO No. Sho. 58-44482, a keyboard assembly taken from an actual grand piano is encased in a cabinet. The use of such an actual keyboard assembly raises the cost of the product and requires a large space for installation.

In the case of JUMO No. Sho. 51-94367, a pair of sideboards carrying a plurality of keys are foldably coupled to each other via hinges. Though inexpensive and convenient for transportation, its construction is too simple and cannot allow players to enjoy subtle key touch.

SUMMARY OF THE INVENTION

It is the object of the present invention to provide a compact, simple and inexpensive keyboard device which provides key touch which is very close to that obtained on an ordinary piano and is well suited for use on an electronic piano and a piano training device.

In accordance with a first aspect of the present invention, a plurality of keys are vertically swingably mounted at their rear ends to a housing, a jack element is pivotally mounted to each key normally in resilient pressure contact with an abutment, and a releaser is fixed to the housing to contact the jack element at key depression and provisionally releases the jack element out of the resilient pressure contact with the abutment.

In accordance with a second aspect of the present invention, a plurality of keys are vertically swingably mouned at their rear ends to a housing, a jack is pivotally mounted to the housing normally in resilient pressure contact with an abutment mounted to each key, and a releaser is attached to each key to contact the jack element at key depression and provisionally release the jack element out of resilient pressure contact with the abutment.

DESCRIPTION OF THE PREFERRED EMBODIMENTS

Figure 1:
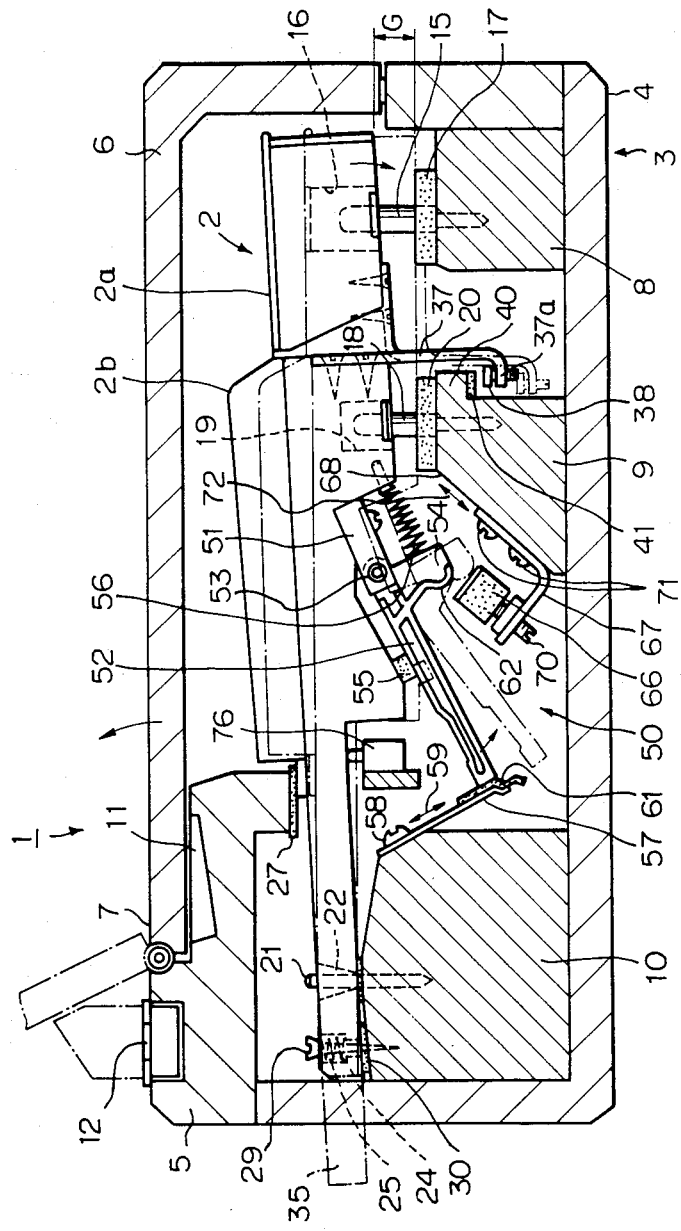
FIGS. 1 to 3 are side views, partly in section, of first to third embodiments of the keyboard device of the present invention, respectively.

One embodiment of the keyboard device in accordance with the present invention is shown in FIG. 1, in which the main part of the keyboard device 1 is encased in a rectangular housing 3 which includes a box 4 made of front, rear, side and bottom walls, a cover 5 closing the rear upper openings of the box 4, and a lid 6 pivoted to the front end of the cover 5 via hinges 7 and closing the front upper opening of the box 4. A front platform 8, a middle platform 9 and a rear platform 10 are arranged on the bottom wall of the box 4 in order to support the keys 2. At a position somewhat forward of the joint to the lid 6, a recess 11 is formed in the top face of the cover 5, and, on the rear side of the joint, a lid supporter 12 is foldably arranged on the cover 5 in order to support the lid 6 when the latter is opened upwards as shown with chain lines. When at rest on the lid supporter 12, the lid 6 also functions as a music board.

A plurality of front pins 15 are arranged in spaced alignment on the top face of the front platform 8. The point of each front pin 15 is received in a recess 16 formed in the bottom face of the white key 2a of an associated key 2 in order to register the front end at a correct position and to inhibit lateral movement of the white key 2a. A felt 17 is inserted over the front pins 15 on the top face of the front platform 8 in order to suppress generation of harsh noises at key depression.

The middle platform 9 is chamferred on its rear end and a plurality of front pins 18 are arranged in spaced alignment on the flat top face of the middle platform 9. The point of each front pin 18 is received in a recess 19 formed in the bottom face of the black key 2b in order to register the front end of the black key 2b at a correct position and to inhibit lateral swing of the black key 2b. A felt 20 is inserted over the front pins 18 on the flat top face of the middle platform 9 in order to suppress generation of harsh noises at key depression.

The rear platform 10 is higher than the front and middle platforms 8 and 9 and a plurality of balance pins 21 are arranged in spaced alignment on its top face. Each balance pin 21 is received in a conical bore 22 formed through the rear end of the associated key 2 in order to allow the key 2 to swing vertically. A spring seat 25 is formed in the top face of the key 2 on the rear side of the balance pin 21 and a compression spring 24 is held in the spring seat 25 by means of a set screw 29 which is screwed into the top face of the rear platform 10 past the rear end of the key 2. The compression spring 24 urges the key 2 to move counterclockwise as viewed in the drawing. Due to the use of this spring, the front end of the key 2 is raised from the front and middle platforms 8 and 9 by a prescribed depth equal to the permitted distance of travel G (referred to hereinafter as the depth of key depression). The extent of this depth of key depression G is adjusted by a felt 30 arranged on the top face of the rear platform 10.

The fact that the compression spring 24 is located near the balance pin 21 makes it necessary to use a large spring force to ensure smooth return of the key 2. In order to obviate this necessity, the rear end of the key 2 may have a rear extension 35 as shown with chain lines which enables the compression spring 24 to be located remote from the balance pin 21. One or more weights may be embedded in this extension in order to further minimize the spring force necessary for smooth key return.

An overhang 40 is formed on the front face of the middle platform 9 and a felt 41 is attached to the lower jaw of the overhang 40. An up-stopper 37 is fixed to the key 2 near the middle platform 9. The up-stopper 37 extends downwards and is provided with a bottom end 37a bent rearwardly and facing the front face of the middle platform 9 below the felt 41 on the overhang 40. An adjuster screw 38 is attached to the bottom end 37a of the up-stopper 37. When the adjuster screw 38 is raised to abut the felt 41 on the overhang 40, the key 2 is blocked against any further upward swing. As the adjuster screw 38 is further raised, the front end of the key 2 is accordingly forced to a lower position in order to adjust the depth of key depression G.

A releaser unit 50 is arranged below the key 2 between the middle and rear platforms 9 and 10. The releaser unit 50 includes a flange 51 fixed to the bottom face of the key 2 and a jack element 52 coupled at its front end to the flange 51 via a pivot 53. The jack element 52 extends rearwardly and downwardly and, as described below in greater detail, its function corresponds to that of a jack in an action assembly on an ordinary piano. The front end of the jack element 52 is provided with a rearward projection 54 and, in the case of the illustrated example, a compression spring 56 is interposed between the projection 54 and a spring seat formed in the bottom face of the key 2 in order to urge the jack element 52 to move clockwise in the drawing. As a substitute for such a compression spring 56, a suitable leaf spring may be attached to the flange 51 in pressure contact with the projection 54 or a helical spring may be attached to the pivot as long as such spring applies a clockwise force to the jack element 52. Due to this clockwise force by the spring, the jack element 52 is normally held at its initial position in pressure contact with a felt 55 attached to the bottom face of the key 2. In this initial position, the jack element 52 extends rearwardly and downwardly as shown with solid lines in the illustration.

A presser in the form of a leaf spring 57 is fixed at its rear end to the chamferred top face of the rear platform 10 via a set screw 58 and extends forwardly and downwardly in a direction substantially normal to that of the jack element 52. The position of the presser 57 is adjustable as shown with an arrow 59. The front end of the presser 57 is kept in pressure contact with the rear end of the jack element 52 via a leather strap 61. The force acting on the jack element 52 from the presser 57 should be chosen to be smaller than the clockwise force provided by the spring 56.

A bracket 67 is fixed to the chamferred top face of the middle platform 9 via set screws 71. The position of the bracket 67 is adjustable in a direction shown with an arrow 72. The rear end of the bracket 67 holds an adjuster screw 70 which in turn carries a releaser 66 facing the round rear face 62 of the projection 54 of the jack element 52. At the terminal stage of key depression, the projection 54 abuts the releaser 66 as shown with chain lines and this abutment causes release of the jack element 52 out of pressure contact with the presser 57. The initial distance between the releaser 66 and the round rear face 62 of the projection 54 is adjustable by turning the adjuster screw 70 on the bracket 67.

The keyboard device in FIG. 1 operates as follows. Normally, the key 2 and the releaser unit 50 assume the initial positions shown with solid lines in FIG. 1. When one key 2 is depressed against repulsion by the compression spring 24, the key 2 swings downwards around the bottom end of the conical bore 22 for the balance pin 21. Then the jack element 52 also moves downwards with the key 2 and, at the terminal stage of key depression, the rear face 62 of its downward projection 54 abuts against the releaser 66 on the middle platform 9. Since the key 2 is further forced to swing downwards, the jack element 52 is swung counterclockwise against the force by the spring 56 so that it is provisionally released out of pressure contact with the presser 57 as shown with chain lines. After key depression has been terminated, the key 2 swings back to resume its initial position due to repulsion by the compression spring 24 and the rear face 62 of the projection 54 of the jack element 52 now stays out of pressure contact with the releaser 66. Then the jack element 52 is swung clockwise about the pivot 53 by the force of the spring 56 and its rear end is again brought into pressure contact with the front end of the presser 57 in order to enable next key depression.

In the mechanism described above, the function of the jack element 52 corresponds to that of a jack in an action assembly of an ordinary piano, the function of the releaser 66 corresponds to a regulating button and the force provided by the presser 57 corresponds to the weight of a hammer.

When the keyboard device is used for an electronic piano and/or a piano training device, key touch on the fingers of the player is very close to that obtained on an ordinary piano equipped with ordinary action assemblies. In particular, the release and return of the releaser unit 50 makes the key touch close to that on the ordinary piano. A simple, compact and inexpensive construction results from the mere attachment of the releaser unit 50 to each key in the keyboard.

When applied to an electronic piano, the keyboard device includes key switches attached to the keys and connected to a known electronic circuit. Despite the absence of the ordinary action assemblies, the player can enjoy subtle key touch on the fingers by which mode of performance can be controlled quite freely and beautifully.

Figure 2:
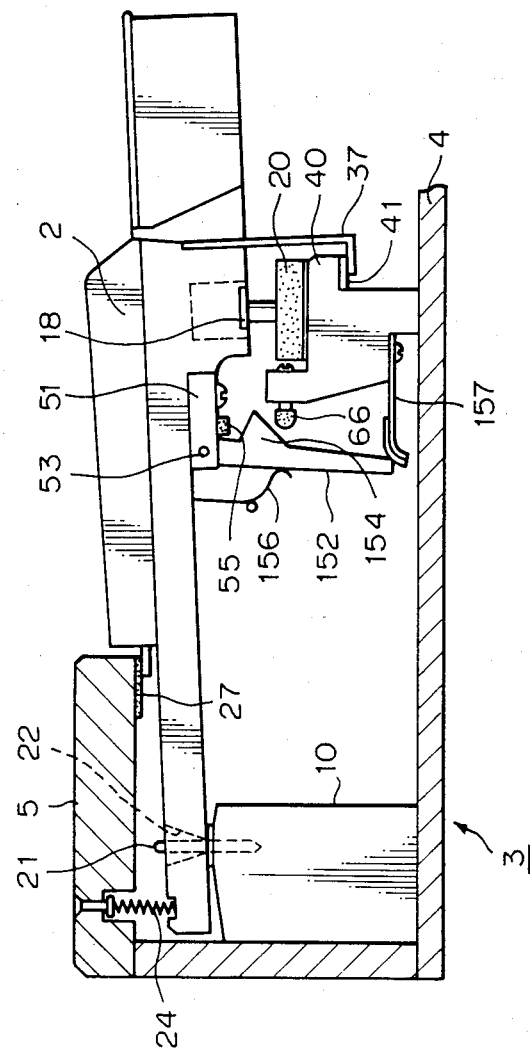

Another embodiment of the keyboard device in accordance with the present invention is shown in FIG. 2, in which parts substantially the same in construction and function as those in FIG. 1 are shown with the same reference numerals and their explanation is omitted. In the case of this embodiment, a compression spring 24 is interposed between the rear end top face of the key 2 and the cover 5. A jack element 152 extends rearwards almost vertically with its bottom end in pressure contact with the rear end of a presser 157 attached to the middle platform 9 and oriented almost horizontally. The releaser 66 is arranged at the rear top corner of the middle platform 9 and the jack element 152 is provided with a triangular projection 154 which is normally held in pressure contact with the releaser 66 by a leaf spring 156 attached to the bottom face of the key 2.

Before key depression, the bottom end of the jack element 152 is held in pressure contact with the rear end of the presser 157 by the force of the leaf spring 156 and the triangular projection 154 is kept out of contact with the releaser 66. When key 2 is depressed, the projection 154 abuts against the releaser 66 which then drives the jack element 152 out of contact with the presser 157. When key depression is over, the force of the leaf spring 156 forces the jack element 152 to be again brought into pressure contact with the presser 157. Such an operation is substantially the same as that of the first embodiment.

Figure 3:
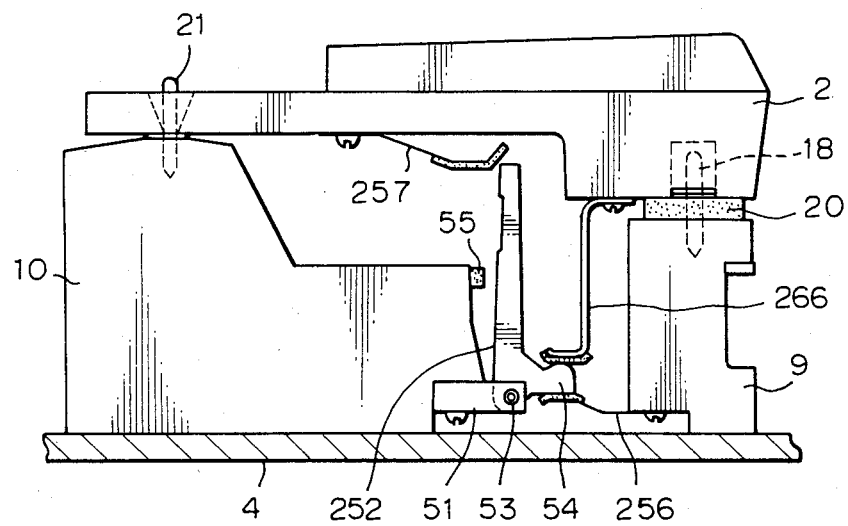

Another embodiment of the keyboard device in accordance with the present invention is shown in FIG. 3 in which the arrangement of the jack element is different from those in the foregoing embodiments. More specifically, a flange 51 is horizontally mounted to a front overhang of the rear platform 10 and pivotally holds at 53 a jack element 252 which extends upwards. The jack element 252 has a projection 54 projecting forwards. A leaf spring 256 is horizontally fixed to the rear face of the middle platform 9 and urges the jack element 252 counterclockwise as viewed in FIG. 3. Due to this spring force, the top end of the jack element 252 is normally kept in pressure contact with the front end of a presser 257 attached to the bottom face of the key 2. A releaser 266 is almost vertically mounted to the bottom face of the key 2. The lower end of the releaser 266 is spaced from and faces the top face of the projection 54.

When the key 2 is depressed, the releaser 266 is also moved downwards and depresses the projection 54 against the force of the leaf spring 256 as shown in FIG. 3. As a consequence the jack element 252 swings clockwise in the drawing to get out of pressure contact with the presser 257. When key depression is over, the releaser 266 moves upwards and the jack element 252 swings counterclockwise due to the force of the leaf spring 256 to resume pressure contact with the presser 257. Though different in arrangement of the related parts, the basic operation of the keyboard device in FIG. 3 is similar to those of the devices shown in FIGS. 1 and 2.

Figure 4:
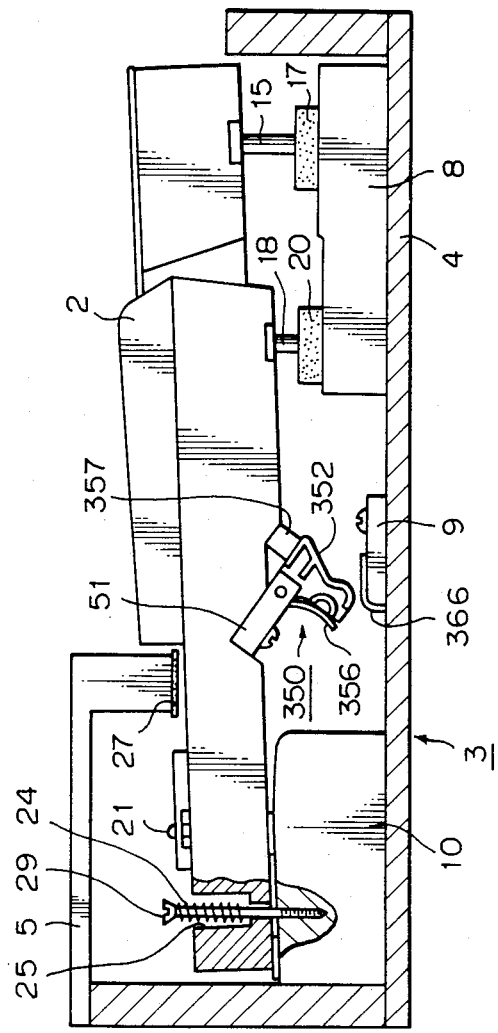
FIG. 4 is a side view, partly in section, of a fourth embodiment of the keyboard device of the present invention.
Figure 5:
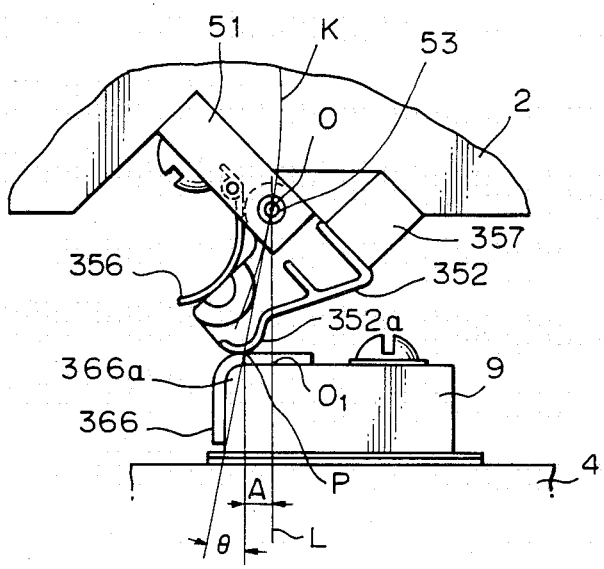
FIGS. 5 and 6 are fragmentary side views of the operation of the keyboard device shown in FIG. 4.
Figure 6:
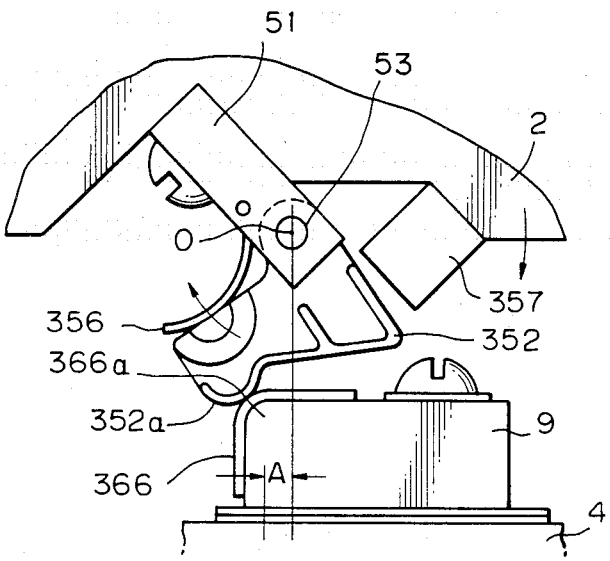

A further embodiment of the keyboard device in accordance with the present invention is shown in FIGS. 4–6, in which a releaser unit 350 includes a flange 51 fixed to the bottom face of the key 2 extending forwardly and downwardly, a jack element 352 pivoted to the front end of the flange 51 and extending rearwardly and downwardly, and a leaf spring 356 attached to the flange 51 in order to normally press the jack element 352 against a seat 357 attached to the bottom face of the key 2. Under normal conditions, the round end face 352a of the jack element 352 is spaced from and faces the rear top corner 366a of a releaser 366 mounted to the middle platform 9. The seat 357 corresponds to the pressers 57, 157 and 257 in its relation to the jack element 352 but is different from them in that it applies no positive spring force to the jack element 352.

As the key 2 swings downwards at key depression, the jack element 352 moves downwards until its end face 352a abuts the top corner 366a of the releaser while keeping pressure contact with the seat 357. When the jack element 352 abuts against the releaser 366 as shown in FIG. 5, the player feels a heavy key touch on the finger placed on the key 2. As the key 2 further swings downwards, resistance of the releaser 366 forces the jack element 352 to swing clockwise about its pivot 53 against the force by the leaf spring 356 while sliding along the top corner 366a of the releaser 366. Thus the jack element 352 gets rid of pressure contact with the seat 357 as shown in FIG. 6. Finally, the end face 352a of the jack element 352 provisionally gets out of contact with the top corner 366a of the releaser 366 and, at this very moment, the player feels light key touch on the finger placed on the key 2. When key depression is over, the jack element 352 moves upwards with the key 2 and swings counterclockwise about the pivot 53 due to force by the leaf spring 356 in order to resume pressure contact with the seat 357.

In the case of this embodiment, the function of the jack element 352 corresponds to that of an ordinary action assembly, the function of the releaser 366 corresponds to that of a regulating button, and the spring force by the leaf spring 356 corresponds to the weight of a hammer.

It should be noted in reference to FIG. 5 that the direction of the counteraction at the initial point of contact P must be in a specified angle range $\theta$. It is assumed that the initial point of contact P is located on the horizontal plane of the releaser 366, that the center of rotation O travels along an orbit K, and that a straight line falling down from the center of rotation O at the initial contact intersects the horizontal plane of the releaser 366 at a point $O_1$. When the distance A between the intersecting point $O_1$ and the initial point of contact P is too small, the jack element 352 contacts the releaser 366 almost in a vertical state, thereby greatly hampering the swing of the key 2. As a consequence, the counteraction is directed towards the center of rotation. When key touch and smooth swing of the key are taken into consideration, the preferable angle range $\theta$ should cover the range of 5° to 30° rearwards from the vertical line at the initial point of contact P.

Figure 7:
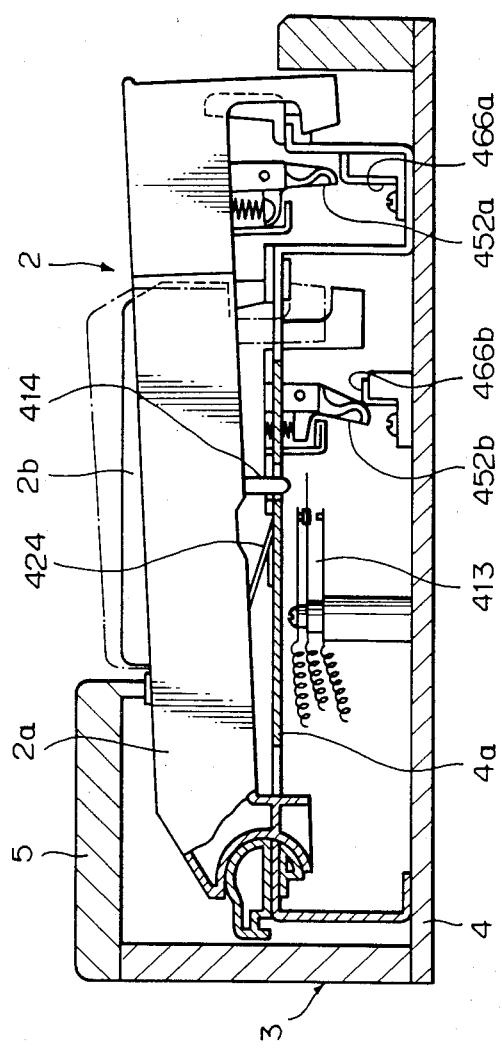
FIG. 7 is a side view, partly in section, of a fifth embodiment of the keyboard device of the present invention.

A still further embodiment of the keyboard device in accordance with the present invention is shown in FIG. 7 in which releaser units for white and black keys 2a and 2b are separated in the longitudinal direction. More specifically, white and black keys 2a and 2b are swingably supported at their rear ends via proper journals and each key is accompanied with a return spring 424 in the form of a leaf spring for automatic swing back and maintenance of the swingable support. Key switches 413 are arranged between the keys in order to be operated by actuators 414 attached to the keys. Each white key 2a is provided with a jack element 452a and each black key 2b is provided with a jack element 452b. Since the white key 2a is not depressed and the black key 2b is depressed in the illustration, the jack element 452a is spaced from and faces a releaser 466a and the jack element 452b is in pressure contact with releaser 466b.

I claim:

1. A keyboard device for use with a keyboard having no hammers nor associated conventional action assemblies for providing a touch similar to that of conventional hammer and action assemblies, said keyboard device comprising:

a housing;
a key swingably mounted to said housing;
a jack element pivotally mounted to said key;
a resilient presser;
means for urging said jack element into resilient pressure contact with said presser so that a counterforce is applied to said key as said key is initially depressed, and
a releaser fixed to said housing in an arrangement to contact said jack element when said key is depressed and to provisionally release said jack element out of said pressure contact with said presser against the action of said urging means after said key has been partially depressed.

2. A keyboard device as claimed in claim 1 in which:
said presser is mounted to said housing; and
said jack element has its rear end normally in resilient pressure contact with said presser and a downward projection spaced from and facing said releaser before said key is depressed.

3. A keyboard device as claimed in claim 2 in which said urging means is a compression spring interposed between said downward projection and a spring seat on said key.

4. A keyboard assembly as claimed in claim 2 in which said presser is a leaf spring.

5. A keyboard device for use with a keyboard having no hammers nor associated conventional action assemblies for providing a touch similar to that of conventional hammer and action assemblies, said keyboard device comprising:
a housing;
a key swingably mounted to said housing;
a jack element pivotally mounted to said housing;
a presser mounted to said key;
means for urging said jack element into resilient pressure contact with said presser; and
a releaser fixed to said key in an arrangement to contact jack element at key depression and to provisionally release said jack element out of said pressure contact with said presser against the action of said urging means after said key has been partially depressed.

6. A keyboard device as claimed in claim 5 in which said jack element has the top end normally in resilient pressure contact with said presser and a front projection normally spaced from and facing said releaser.

7. A keyboard device as claimed in claim 6 in which said urging means is a leaf spring.

8. A keyboard device as claimed in claim 6 in which said presser is a leaf spring.

* * * * *